United States Patent
Geipel et al.

(10) Patent No.: US 11,853,052 B2
(45) Date of Patent: Dec. 26, 2023

(54) CLUSTER BASED CLASSIFICATION FOR TIME SERIES DATA

(71) Applicant: Siemens Aktiengesellschaft, Munich (DE)

(72) Inventors: Markus M. Geipel, Munich (DE); Nikou Günnemann-Gholizadeh, Munich (DE); Stephan Merk, Munich (DE); Sebastian Mittelstädt, Augsburg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 161 days.

(21) Appl. No.: 17/436,141

(22) PCT Filed: Feb. 17, 2020

(86) PCT No.: PCT/EP2020/054130
§ 371 (c)(1),
(2) Date: Sep. 3, 2021

(87) PCT Pub. No.: WO2020/178016
PCT Pub. Date: Sep. 10, 2020

(65) Prior Publication Data
US 2022/0128987 A1    Apr. 28, 2022

(30) Foreign Application Priority Data
Mar. 4, 2019  (EP) ..................................... 19160577

(51) Int. Cl.
G05B 23/02    (2006.01)
(52) U.S. Cl.
CPC ..... G05B 23/0281 (2013.01); G05B 23/0221 (2013.01); G05B 23/0272 (2013.01)

(58) Field of Classification Search
CPC ............ G05B 23/0281; G05B 23/0221; G05B 23/0272
See application file for complete search history.

(56) References Cited

U.S. PATENT DOCUMENTS

| 2007/0279490 A1 | 12/2007 | Zhou et al. |
| 2015/0149134 A1 | 5/2015 | Mehta et al. |
| 2020/0280525 A1* | 9/2020 | Sakurai .................. H04L 41/16 |

FOREIGN PATENT DOCUMENTS

| WO | 2017034512 | 3/2017 |
| WO | WO-2017034512 A1 * | 3/2017 |
| WO | 2018140337 | 8/2018 |

OTHER PUBLICATIONS

PCT International Search Report dated May 19, 2020 based on PCT/EP2020/054130 filed Feb. 17, 2020.

* cited by examiner

*Primary Examiner* — Manuel A Rivera Vargas
(74) *Attorney, Agent, or Firm* — Cozen O'Connor

(57) ABSTRACT

Device and method for analyzing time series data monitored on a machine, wherein the device segments the time series data into multiple time segments, determines a cluster of time segments estimated to have the same dynamics of the time series data, then classifies the cluster based on label information associated with at least one of the time segments, presents at least a part of the time series data of the cluster to a user if none of the time segments of the cluster has associated label information, classifies the cluster and generates label information associated with the time segments of the cluster based on a user input received in response to presentation of the time series data, where the generated label information indicates a result of classifying the cluster.

20 Claims, 4 Drawing Sheets

CLUSTER BASED CLASSIFICATION FOR TIME SERIES DATA

CROSS-REFERENCE TO RELATED APPLICATIONS

This is a U.S. national stage of application No. PCT/2020/054130 filed 17 Feb. 2020. Priority is claimed on European Application No. 19160577.3 filed 4 Mar. 2019, the content of which is incorporated herein by reference in its entirety.

BACKGROUND OF THE INVENTION

1. Field of the Invention

The present disclosure relates to devices and methods for analyzing time series data.

2. Description of the Related Art

In various technical fields, there is a need to monitor operation of machines or machine systems. For example, in the field of oil or gas production, a large number of pumps, typically electric submersible pumps (ESPs), may be monitored for purposes of providing preventive maintenance and thereby ensuring high availability.

In order to efficiently monitor a large number of machines, it is desirable to utilize a monitoring mechanism that is, at least in part, based on artificial intelligence (AI). Such an AI based mechanism may analyze time series data obtained by monitoring a plurality of machines, automatically identify anomalous behavior, and trigger measures to resolve issues causing the anomalous behavior, e.g., by issuing a warning to an operator. When monitoring pumps, the AI based mechanism may for example automatically classify a detected anomaly, e.g., as a congestion, a leakage, and/or a broken shaft.

The AI mechanism may be based on pre-defined rules, e.g., formulated by a domain expert, and/or on machine learning. However, formulating and maintaining appropriate rules is typically a complex task. The machine learning approach, on the other hand, typically corresponds to a black-box approach. That is, the output of the AI mechanism trained by a machine learning process may be difficult to understand and will typically offer no further explanations of reasons for its decisions or classifications. Moreover, the machine learning process typically requires a rather large amount of manually prepared training data, and preparation of such training data may be a tedious process. Still further, when utilizing machine learning, the AI mechanism may only be applied unless the machine learning process was completed to at least some extent, so that immediately addressing new behavior types is typically not possible.

WO 2017/034512 A1 describes interactive analytics of time series data, involving automated segmenting and clustering of the time series data based on machine learning and user interaction.

WO 2018/140337 A1 describes a semi-supervised approach for machine condition monitoring and fault diagnosis, involving partitioning time series data into segment clusters and clustering the segment clusters into cluster prototypes, which are used to learn a discriminative model that predicts a class label. A user may manually supply labels for segment clusters after they are created.

US 2007/279490 A1 discloses mining of surveillance videos to detect abnormal events, using a two stage training process. In the first stage, unsupervised clustering is performed on segments of the video streams, and a set of abnormal events are combined with user feedback to generate a clean training set. In the second set, the clean training set is used to train a more precise model.

Accordingly, there is a need for technologies that allow for efficiently and accurately classifying time series data obtained by monitoring a machine.

SUMMARY OF THE INVENTION

In view of the foregoing, it is therefore an object of the present invention to provide a device and a method for analyzing time series data.

This and other objects are achieved in accordance with the invention by device that is configured to obtain time series data monitored on a machine, e.g., a pump, a mill, an electric motor, a combustion engine, and/or a turbine, segment the time series data into multiple time segments, determine a cluster of time segments estimated to have the same dynamics of the time series data, check whether label information associated with at least one of the time segments is available, if label information associated with at least one of the time segments is available, then classify the cluster based on label information associated with at least one of the time segments, if none of the time segments of the cluster has associated label information, the present at least a part of the time series data of the cluster to a user, and based on a user input received in response to the presenting at least a part of the time series data, classify the cluster and generate label information associated with the time segments of the cluster, where the generated label information indicates a result of classifying the cluster.

In this way, the device may enable efficient classification of the time series data by utilizing existing label information for other time series data showing similar dynamics, while at the same time new behavior types may be addressed by invoking a user input to classify the time series data and generate new label information. The user, e.g., a domain expert or machine learning expert, may thus manage the generation of new label information in an intuitive and efficient manner and enable efficient learning new behavior types identified in the time series data during regular monitoring operation.

In accordance with an embodiment, the device is configured to determine the time segments of the time series data and the cluster based on a probabilistic model of the dynamics of the time series data. In this way, the similarities of the time series data at different times may be assessed in a precise and reproducible manner.

In accordance with another an embodiment, the device is further configured to present at least a part of the time series data of the cluster to the user if two or more of the time segments of the cluster have conflicting associated label information. Accordingly, conflicting classifications may be resolved in an efficient and intuitive manner.

In accordance with an embodiment, the device is further configured to select a non-conflicting part of the label information and classify the cluster based on the selected non-conflicting part of the label information if two or more of the time segments of the cluster have conflicting associated label information. The device may be configured to select the non-conflicting part of the label information based on an accumulated time length of the time segments associated with the label information. Alternatively or in addition, the device may be configured to select the non-conflicting part of the label information based on a probabilistic model of the dynamics of the time series data.

In this way, the conflict of the label information may be resolved in an automated manner, or the device may efficiently assist the user in resolving the conflict of the label information.

In accordance with yet another embodiment, the device is configured to classify the cluster by assigning the cluster to one of multiple categories comprising: regular operation of the machine, ab normal operation of the machine, unknown dynamics, and conflicting label information. However, it should be noted that further categories could also be utilized, e.g., different types of abnormal operation or different types of regular operation. These categories may enable efficient monitoring of the machine and efficient management of learning new behavior types identified in the time series data during regular monitoring operation.

It is also an object of the invention to provide a method of analyzing time series data, where the method comprises obtaining time series data monitored on a machine, e.g., a pump, a mill, an electric motor, a combustion engine, and/or a turbine, segmenting the time series data into multiple time segments, determining a cluster of time segments estimated to have the same dynamics of the time series data checking whether label information associated with at least one of the time segments is available, if label information associated with at least one of the time segments is available, then classifying the cluster based on label information associated with at least one of the time segments if none of the time segments of the cluster has associated label information, then presenting at least a part of the time series data of the cluster to a user, and based on a user input received in response to said presenting at least a part of the time series data, classifying the cluster and generating label information associated with the time segments of the cluster, where the generated label information indicates a result of classifying the cluster.

In this way, the method may enable efficient classification of the time series data by utilizing existing label information for other time series data showing similar dynamics, while at the same time new behavior types may be addressed by invoking a user input to classify the time series data and generate new label information. The user, e.g., a domain expert or machine learning expert, may thus manage the generation of new label information in an intuitive and efficient manner and enable efficient learning new behavior types identified in the time series data during regular monitoring operation.

In accordance with an embodiment, the method further comprises determining the time segments of the time series data and the cluster based on a probabilistic model of the dynamics of the time series data. In this way, the method may enable assessing similarities of the time series data at different times in a precise and reproducible manner.

In accordance with an embodiment, the method further comprises presenting at least a part of the time series data of the cluster to the user if two or more of the time segments of the cluster have conflicting associated label information. In this way, the method may enable resolving conflicting classifications in an efficient and intuitive manner.

In accordance with a further embodiment, the method further comprises selecting a non-conflicting part of the label information and classifying the cluster based on the selected non-conflicting part of the label information if two or more of the time segments of the cluster have conflicting associated label information. Selecting the non-conflicting part of the label information may be based on an accumulated time length of the time segments associated with the label information and/or on a probabilistic model of the dynamics of the time series data.

In this way, the conflict of the label information may be re solved in an automated manner, or assistance to the user in resolving the conflict of the label information may be provided in an efficient manner.

In accordance with an embodiment, the method further comprises classifying the cluster by assigning the cluster to one of multiple categories comprising regular operation of the machine, abnormal operation of the machine, unknown dynamics, and conflicting label information. However, it should be noted further categories could also be utilized, e.g., different types of abnormal operation or different types of regular operation. These categories may enable efficient monitoring of the machine and efficient management of learning new behavior types identified in the time series data during regular monitoring operation.

In the above-disclosed embodiments of the device or method, the machine may comprise a pump. Here, the time series data may comprise at least one of a motor temperature of the pump, an inlet temperature of the pump, an operating power of the pump, a pressure inside the pump, and/or a pressure outside the pump. Accordingly, the device or method may be utilized enabling enhanced monitoring of the pump, e.g., by an AI based mechanism.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, embodiments of the present disclosure will be described in more detail and with reference to the accompanying drawings, in which.

DETAILED DESCRIPTION OF THE EXEMPLARY EMBODIMENTS

It is noted that, in the following detailed description of embodiments, the accompanying drawings are only schematic and that the illustrated elements are not necessarily shown to scale. Rather, the drawings are intended to illustrate functions and cooperation of components. Here, it is to be understood that any connection or coupling of functional blocks, devices, components, or other physical or functional elements could also be implemented by an indirect connection or coupling, e.g., via one or more intermediate elements. A connection or coupling of elements or components can, for example, be implemented by a wire-based, a wireless connection, and/or a combination of a wire-based and a wireless connection. Functional blocks can be implemented by dedicated hardware, by firmware and/or software installed on programmable hardware, and/or by a combination of dedicated hardware and firmware or software.

Figure 1:
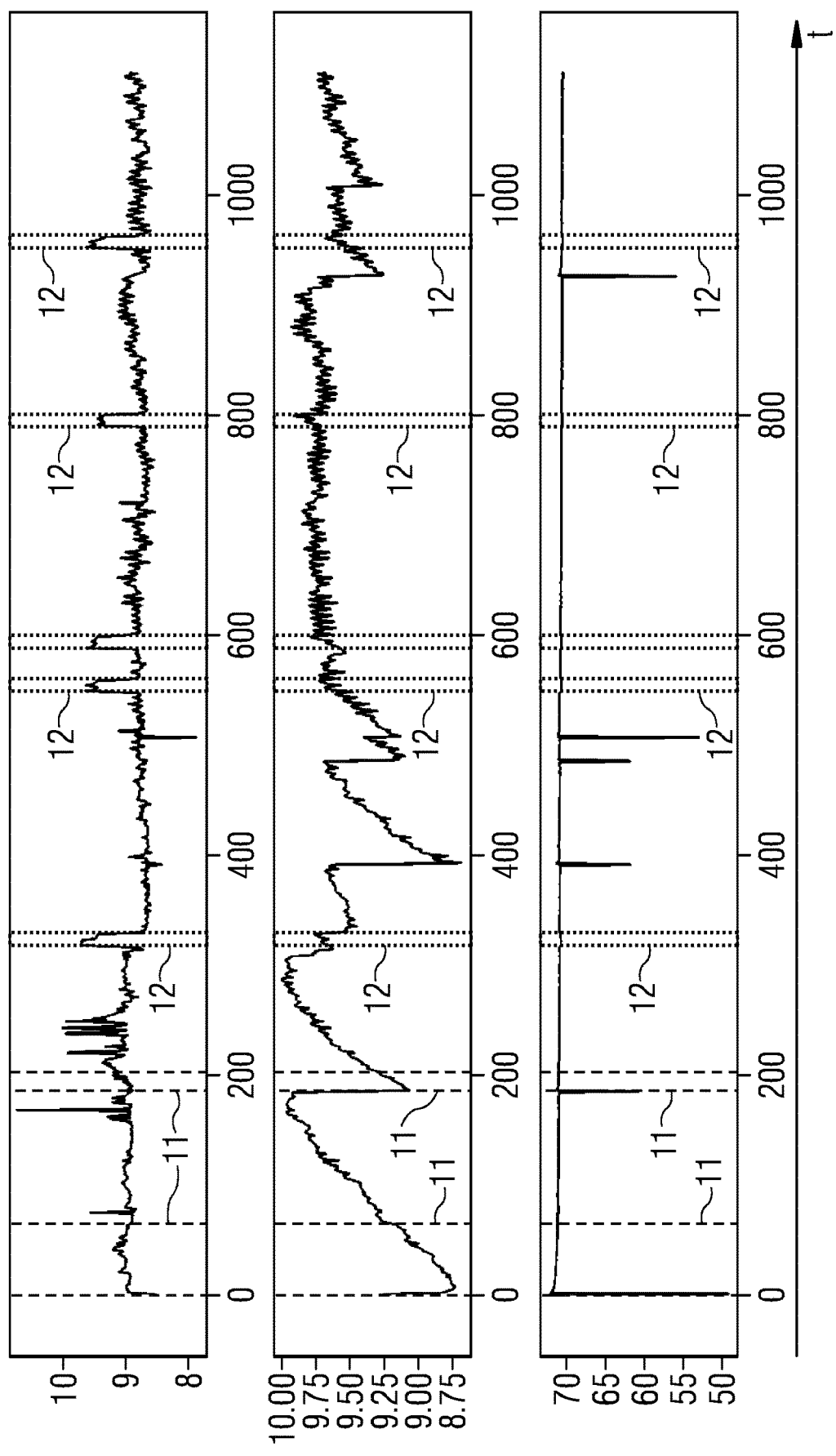
FIG. 1 is a graphical plot of exemplary time series data that may be analyzed in accordance with an embodiment of the present invention.

FIG. 1 schematically illustrates exemplary time series data. The time series data may, for example, be provided by sensors on an electric submersible pump (ESP). The time series data could, for example, comprise a pressure measured inside the ESP, such as a head pressure of the ESP. Further, the time series data could comprise a pressure measured outside the ESP, such as an annulus pressure or ground pressure. Still further, the time series data could comprise an operating power of the ESP, e.g., in terms of a motor current.

FIG. 1 further illustrates exemplary clusters 11, 12 of the time series data. Each cluster 11, 12 corresponds to multiple time segments of the time series data that are estimated to exhibit similar dynamics of the time series data. The cluster 11 may, for example, include time segments in which the time series data exhibit dynamics corresponding to regular operation of the ESP, while the cluster 12 may include time segments in which the time series data exhibit dynamics corresponding to abnormal operation of the ESP. It should be noted the clusters 11, 12 shown in FIG. 1 are merely exemplary and in practical scenarios more clusters may be identified in the time series data. Even if two clusters show different dynamics of the time series data, they may belong to the same category, e.g., regular operation or abnormal operation. Typically, a cluster will include multiple time segments of the time series data, which occurred at different times.

Figure 2:
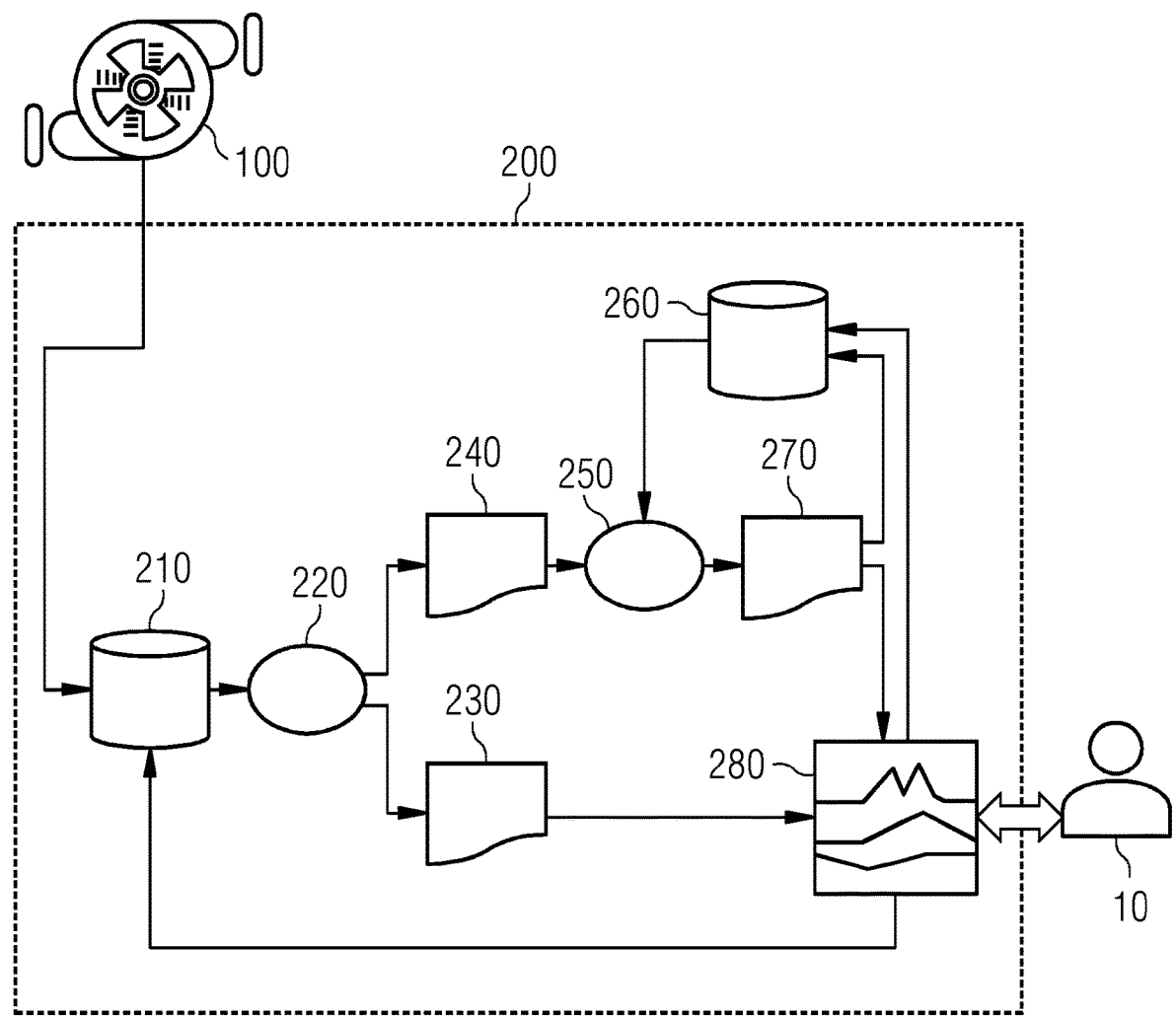
FIG. 2 is a schematic block diagram of a monitoring system in accordance with an embodiment of the present invention.

FIG. 2 schematically illustrates a monitoring system equipped with an analysis tool 200 configured to perform the classification of the time series data in accordance with the illustrated concepts.

As illustrated, the analysis tool 200 receives time series data from a machine 100. As mentioned above, the machine 100 may be a pump, in particular an ESP. However, it should be understood the analysis tool 200 could also be utilized for analyzing time series data monitored on other types of machines, e.g., an industrial mill, a turbine, or a combustion engine.

In the illustrated example, the analysis tool 200 is provided with a memory 210 for storing the time series data monitored on the machine. The time series data are then provided to a segmentation stage 220. The segmentation stage 220 segments the time series data into multiple time segments in which the time series data exhibits a certain type of dynamic or behavior. The segmentation may be based on fitting one or more probabilistic models to the time series data. The probabilistic model (s) may, for example, be based on a Gaussian mixture mode. As a result, the segmentation stage 220 outputs multiple time segments 230 of the time series data. Further, the segmentation stage 220 also identifies clusters of the time segments 230. The clusters correspond to groups of time segments exhibiting similar dynamics of the time series data, e.g., like the clusters 11, 12 in the example of FIG. 1. The clusters may, for example, be identified in terms of time segments matching the same probabilistic model. As a result, the segmentation stage 220 outputs cluster information 240 describing the identified clusters.

The cluster information 240 is provided to a classification stage 250. The classification stage 250 classifies the clusters into different categories. In the illustrated example, these categories include "regular operation", "abnormal operation", "unknown behavior", and "conflicting". As a result, the classification stage 250 outputs cluster classification information 270.

The classification is based on label information stored in a memory 260. For a certain time-segment, the label information may indicate a result of an earlier classification. The earlier classification may be a manual classification based on a user input, e.g., by a domain expert, or may be an automatic or semi automatic classification by the analysis tool 200 itself or by some other automated analysis system. However, that it is also possible that for some time segments of a cluster no label information is available yet.

If for a certain time segment of the cluster label information is available and indicates a certain classification, then the classification stage 250 may classify the other time segments of the cluster according to the same classification.

For example, if for one of the time segments of the cluster the label information indicates a classification in the cate gory "regular operation", also the other time segments of the cluster and thus the entire cluster may be classified in the category "regular operation". Similarly, if for one of the time segments of the cluster the label information indicates a classification in the category "abnormal operation", also the other time segments of the cluster and thus the entire cluster may be classified in the category "abnormal operation".

If, on the other hand, no label information is available for the time segments of the cluster, then the classification stage 250 may first classify the cluster in the category "unknown behavior". At least a part of the time series data of the cluster, e.g., on or more of the time segments, may then be presented on a user interface 280 to prompt input by a user 10, e.g., a domain expert. The presentation of the time series data on the user interface 280 may also be supplemented by explanatory information, e.g., when or how often the corresponding behavior was observed, or reliability information of the measured time series data, e.g., in terms of a mean value and standard deviation.

Based on the user input, the cluster may then be re-classified in one of the categories "regular operation" and "abnormal operation" and corresponding label information provided to the memory 260.

In some situations, there may also be conflicting label information for the time segments of the cluster. For example, for one or more of the time segments of the cluster, the label information could indicate an earlier classification in the category "regular operation", while for one or more other time segments of the cluster the label information could indicate an earlier classification in the category "abnormal operation". In this case, the classification stage 250 may first classify the cluster in the category "conflicting". At least a part of the time series data of the cluster, e.g., one or more of the time segments, may then be presented on the user interface 280 to prompt input by the user 10. The presentation of the time series data on the user interface 280 may also be supplemented by explanatory information, e.g., when or how often the corresponding behavior was observed, or reliability information of the measured time series data, e.g., in terms of a mean value and standard deviation.

Based on the user input, the conflict of the label information may be resolved and the cluster may then be re-classified in one of the categories "regular operation" and "abnormal operation" and corresponding label information provided to the memory 260.

In some scenarios, the user input provided via the user interface 280 may also be used for adapting parameters utilized in the segmentation stage 220, e.g., in terms of definitions of relevant features to be considered in the segmentation process.

The analysis tool 200 may reiterate these processes for newly arriving time series data, thereby continuously accumulating further label information and refining existing label information. The accumulated and refined label information, in turn, increases the likelihood of being able to automatically classify newly arriving time series data either in the category "regular operation" or in the category "abnormal operation" and avoid prompting further user input.

Figure 3:
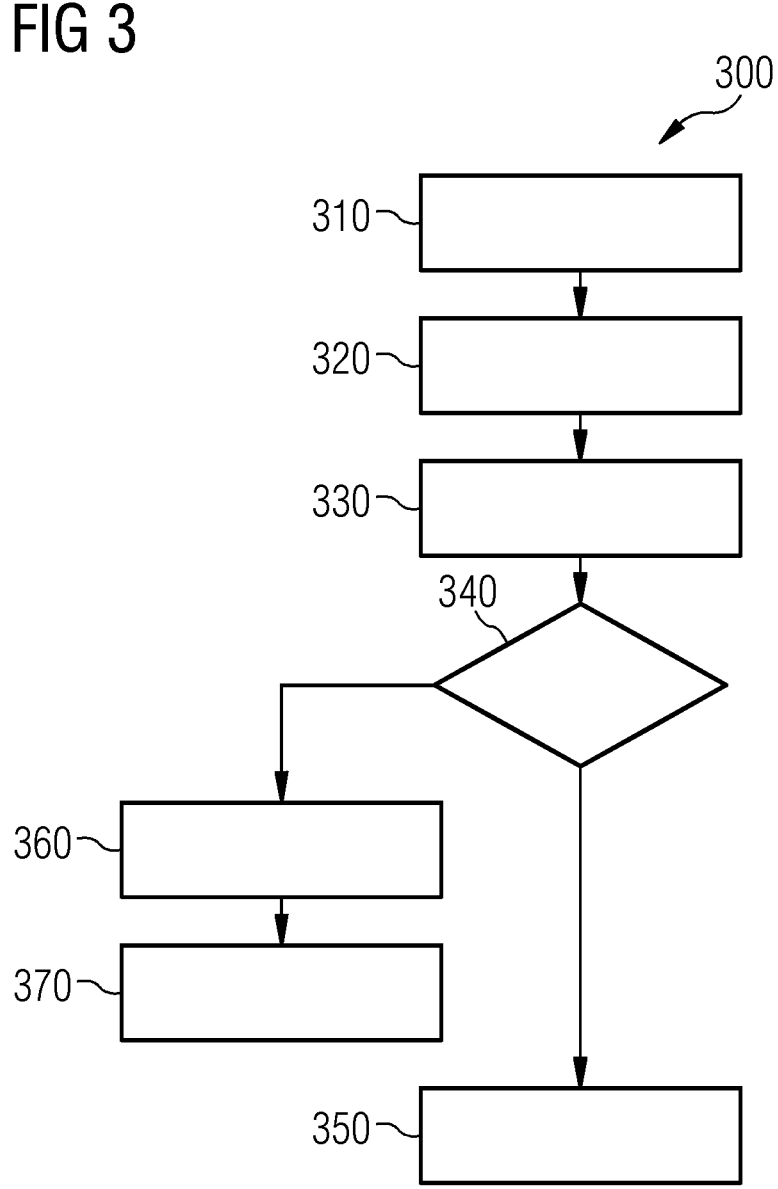
FIG. 3 is a flowchart of the method in accordance with an embodiment of the present invention.

FIG. 3 shows a flow chart for illustrating a method that can be used for implementing the illustrated concepts in a device, such as in the above-mentioned analysis tool 200. The method may, for example, be implemented by execution of program code by one or more processors of the device. The program code can be stored in a memory of the device.

At block 310, the device obtains time series data monitored on a machine, such as the above-mentioned machine 100. The machine may correspond to or include at least one of a pump, e.g., an ESP, a mill, an electric motor, a combustion engine, and/or a turbine. If the machine comprises a pump, then the time series data may comprise at least one of a motor temperature of the pump, an inlet temperature of the pump, an operating power of the pump, a pressure inside the pump, and/or a pressure outside the pump.

At block 320, the device segments the time series data into multiple time segments. The time segments of the time series data may be determined based on a probabilistic model of the dynamics of the time series data.

At block 330, the device determines a cluster of time segments estimated to have the same dynamics of the time series data. The cluster may be determined based on a probabilistic model of the dynamics of the time series data, e.g., based on the same probabilistic model used for segmenting the time series data at block 320.

The device then classifies the cluster based on label information associated with at least one of the time segments of the cluster. This may involve assigning the cluster to one of multiple categories comprising regular operation of the machine, abnormal operation of the machine, unknown dynamics, and conflicting label information.

At block 340, the device checks whether label information is available for at least one of the time segments of the cluster.

If at block 340 it is found that label information is available for at least one of the time segments of the cluster, then the device continues with block 350 and classifies the cluster based on the label information associated with the at least one time segment. This may involve that other time segments of the cluster, for which label information is not yet available, are classified in the category indicated by the available label information.

If at block 340 it is found that no label information is available for the time segments of the cluster, then the device continues with block 360 and presents at least a part of the time series data of the cluster to a user. At block 370 the device then classifies the cluster based on a user input received in response to presenting the time series data at block 360. Further, the device generates label information associated with the time segments of the cluster. The generated label information indicates a result of classifying the cluster.

In some scenarios, two or more of the time segments of the cluster may have conflicting associated label information. Also in this, case the device may present at least a part of the time series data of the cluster to the user and classify the cluster based on a user input received in response to presenting the time series data. Alternatively or in addition, the device may select a non-conflicting part of the label information and classify the cluster based on the selected non-conflicting part of the label information. Selecting the non-conflicting part of the label information may be based on an accumulated time length of the time segments associated with the label information and/or based on a probabilistic model of the dynamics of the time series data, e.g., the same probabilistic model used for segmenting the time series data at block 320 or the same probabilistic model used for the cluster at block 330.

Figure 4:
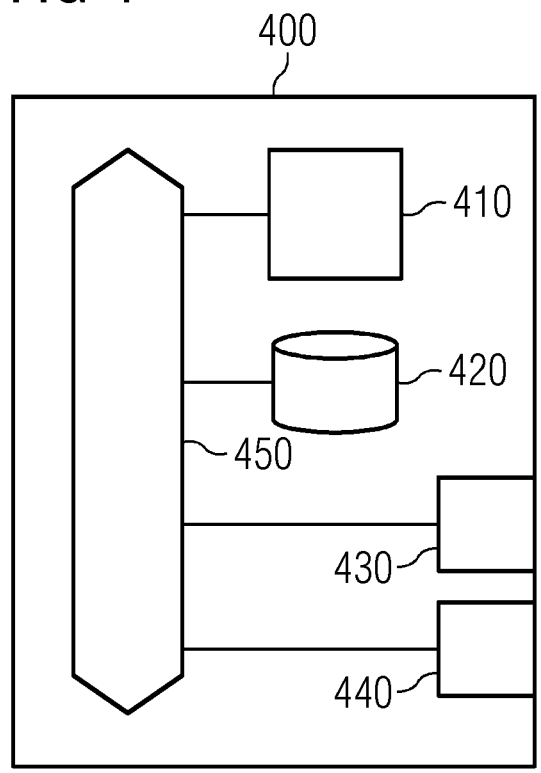
FIG. 4 is a schematic block diagram of the structures of a device in accordance with the present invention.

The method 400 of FIG. 4 may be repeated to identify and classify multiple clusters in the time series data and for newly obtained time series data.

FIG. 4 shows a block diagram for schematically illustrating structures of a device 400. The device 400 may, for example, be used for implementing the above-mentioned analysis tool 200. In the illustrated example, the device 400 includes at least one processor 410 and a memory 420. Further, the device 400 includes at least one data interface 430, which may be used for obtaining the above-mentioned time series data and initial label information. Further, the device 400 may also include a user interface 440 for presenting time series data to a user and receiving user inputs, e.g., to classify clusters without existing label information, to resolve conflicting classifications, or to define label information. The components of device 400, i.e., the at least one processor 410, the memory 420, the at least one data interface 440, and the user interface 440, may for example be coupled to each other by a data bus 450 or similar internal communication infra structure of the device 400. By execution of program code by the at least one processor 410, the device 400 may be configured to operate in accordance with the above-described functionalities of the analysis tool 200 and/or implement the method 300 as explained in connection with FIG. 3.

It is to be understood that the above description of examples is intended to be illustrative and that the illustrated concepts are susceptible to various modifications. For example, the illustrated concepts could be applied to monitoring various types of machine or machine systems and various types of data which can be monitored on a machine or machine system, and the classification of the time series data may be utilized in various ways.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for analyzing time series data, comprising:

a processor; and
memory;
wherein the device is configured to:
obtain time series data monitored on a machine;
segment the time series data into multiple time segments;
determine a cluster of time segments estimated to have time characteristics which match time characteristics of the monitored time series data;
provide cluster information to a classification stage as a first input;
check whether label information indicating classification information associated with at least one time segment of the time segments is available;
provide the label information to the classification stage as a second input to classify the cluster based on the label information associated with at least one of the time segments if label information indicating the classification information associated with at least one time segment of the time segments is available;
present at least a part of the time series data of the cluster to a user if none of the time segments of the cluster has associated label information; and
classify the cluster and generate label information associated with the time segments of the cluster based on a user input received in response to said presentation of at least a part of the time series data, the generated label information indicating a result of classifying the cluster.

2. The device according to claim 1, wherein the device is further configured to select a non-conflicting part of the label information and classify the cluster based on the selected non-conflicting part of the label information if at least two of the time segments of the cluster have conflicting associated label information.

3. The device according to claim 2, wherein the device is configured to select the non-conflicting part of the label information based on an accumulated time length of the time segments associated with the label information.

4. The device according to claim 3, wherein the device is configured to select the non-conflicting part of the label information based on a probabilistic model of the time series data.

5. The device according to claim 2, wherein the device is configured to select the non-conflicting part of the label information based on a probabilistic model of the time series data.

6. The device according to claim 1, wherein the device is configured to determine the time segments of the time series data and the cluster based on a probabilistic model of the time series data.

7. The device according to claim 6, wherein the device is further configured to present at least a part of the time series data of the cluster to the user if at least two of the time segments of the cluster have conflicting associated label information.

8. The device according to claim 1, wherein the device is further configured to present at least a part of the time series data of the cluster to the user if at least two of the time segments of the cluster have conflicting associated label information.

9. The device according to claim 1, wherein the device is configured to classify the cluster by assigning the cluster to one of multiple categories comprising regular operation of the machine, abnormal operation of the machine, unknown dynamics, and conflicting label information.

10. The device according to claim 1, wherein the machine comprises at least one of a pump, a mill, an electric motor, a combustion engine, and a turbine.

11. The device according to claim 1, wherein the machine comprises a pump and the time series data comprise at least one of: a motor temperature of the pump, an inlet temperature of the pump, an operating power of the pump, a pressure inside the pump, a pressure outside the pump.

12. A method for analyzing time series data, the method comprising:
obtaining time series data monitored on a machine;
segmenting the time series data into multiple time segments;
determining a cluster of time segments estimated to have time characteristics which match time characteristics of the monitored time series data;
providing cluster information to a classification stage as a first input;
checking whether label information indicating classification information associated with at least one time segment of the time segments is available;
providing the label information to the classification stage as a second input to classify the cluster based on the label information associated with at least one of the time segments if label information indicating the classification information associated with at least one of the time segments is available;
presenting at least a part of the time series data of the cluster to a user if none of the time segments of the cluster has associated label information; and
classifying the cluster and generating label information associated with the time segments of the cluster based on a user input received in response to said presenting at least a part of the time series data, the generated label information indicating a result of classifying the cluster.

13. The method according to claim 12, further comprising:
presenting at least a part of the time series data of the cluster to the user and/or selecting a non-conflicting part of the label information and classifying the cluster based on the selected non-conflicting part of the label information if at least two of the time segments of the cluster have conflicting associated label information.

14. The method according to claim 13, comprising: selecting the non-conflicting part of the label information based on an accumulated time length of the time segments associated with the label information and/or selecting the non-conflicting part of the label information based on a probabilistic model of the time series data.

15. The method according to claim 14, further comprising:
classifying the cluster by assigning the cluster to one of multiple categories comprising regular operation of the machine, abnormal operation of the machine, unknown dynamics, and conflicting label information.

16. The method according to claim 13, further comprising:
classifying the cluster by assigning the cluster to one of multiple categories comprising regular operation of the machine, abnormal operation of the machine, unknown dynamics, and conflicting label information.

17. The method according to claim 12, further comprising: determining the time segments of the time series data and the cluster based on a probabilistic model of the time series data.

18. The method according to claim 17, further comprising:
    classifying the cluster by assigning the cluster to one of multiple categories comprising regular operation of the machine, abnormal operation of the machine, unknown dynamics, and conflicting label information.

19. The method according to claim 12, further comprising:
    classifying the cluster by assigning the cluster to one of multiple categories comprising regular operation of the machine, abnormal operation of the machine, unknown dynamics, and conflicting label information.

20. A computer program product comprising a non-transitory computer readable medium encoded with computer executable code which, when executed on a processor, causes analysis of time series data, the computer executable code comprising:
    program code for obtaining time series data monitored on a machine;
    program code for segmenting the time series data into multiple time segments;
    program code for determining a cluster of time segments estimated to have time characteristics which match time characteristics of the monitored time series data;
    program code for providing cluster information to a classification stage as a first input;
    program code for checking whether label information indicating classification information associated with at least one time segment of the time segments is available;
    providing the label information to the classification stage as a second input to classify the cluster based on the label information associated with at least one of the time segments if label information indicating the classification information associated with at least one of the time segments is available;
    program code for presenting at least a part of the time series data of the cluster to a user if none of the time segments of the cluster has associated label information; and
    program code for classifying the cluster and generating label information associated with the time segments of the cluster based on a user input received in response to said presenting at least a part of the time series data, the generated label information indicating a result of classifying the cluster.

\* \* \* \* \*